2,900,078
Patented Aug. 18, 1959

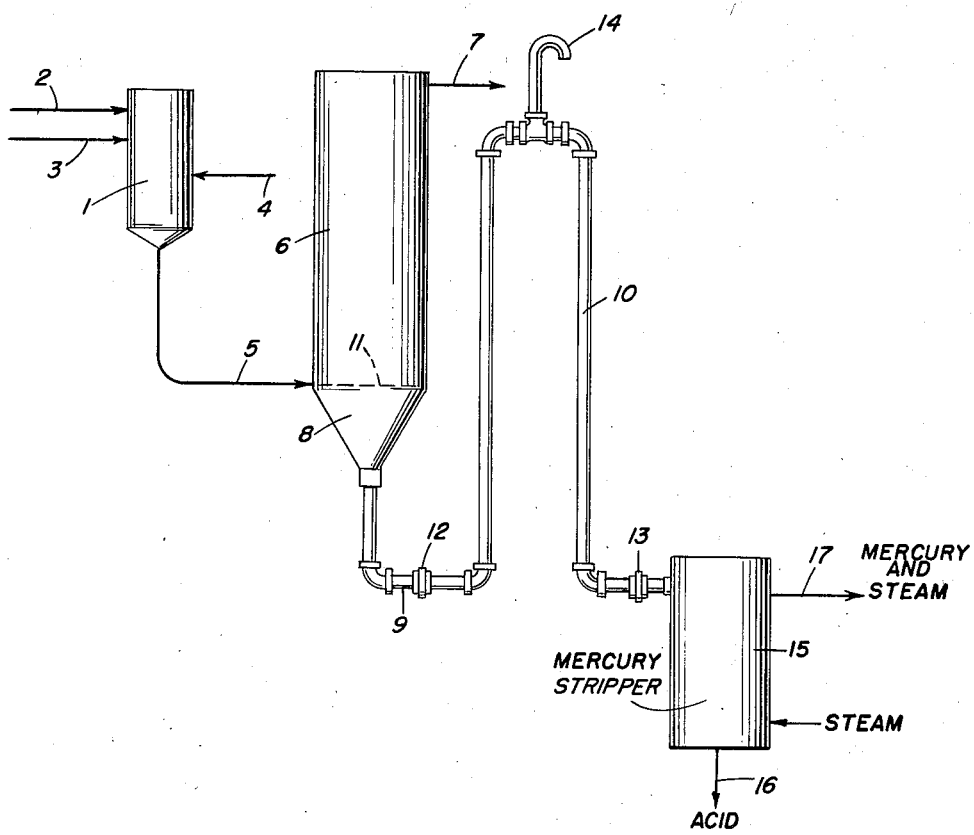

2,900,078
CONTINUOUS SEPARATION OF MERCURY-CONTAINING SULFURIC ACID FROM ORGANIC LIQUIDS

Nathan Federgreen, Newark, N.J., and Donald G. Jordan, Stamford, Conn., assignors to American Cyanamid Company, New York, N.Y., a corporation of Maine Application January 23, 1956, Serial No. 560,845

4 Claims. (Cl. 210—83)

This invention relates to the separation of finely-suspended bodies from a liquid. More particularly, this invention is directed to the separation of finely-suspended droplets of metallic mercury from a two-phase liquid system wherein the liquid phases are, respectively, organic and sulfuric acid.

It is well known that dispersions of mercuric compounds, such as mercuric sulfate, mercuric chloride, and other mercuric salts of organic and inorganic acids in strong sulfuric acid may be used in reactions involving the transformation of organic compounds. Mercuric oxide dispersions have also been employed in this respect. One of the earliest processes employing such catalysts was probably the liquid phase oxidation of naphthalene to phthalic anhydride with strong sulfuric acid containing mercuric sulfate. Other similar processes wherein sulfuric acid containing mercuric compounds dispersed therein as catalysts for these reactions will be obvious to those skilled in the art.

In chemical reactions wherein the catalyst employed is a strong mineral acid, such as sulfuric acid, containing dispersions of mercuric compounds as the catalyst, the recovery of the metallic mercury has always presented a very difficult problem. It has been determined, as set forth and claimed in the now copending application, Serial No. 413,593, filed March 2, 1954, now U.S. Patent 2,832,810, that the separation of the mercury from the sulfuric acid may be effectively accomplished by the use of superheated steam. However, before such a separation can be accomplished, there should be an effective separation of the waste sulfuric acid, containing the mercuric compounds dispersed therein, from the organic phase. If the metallic mercury is not effectively removed from the organic phase of the chemical reaction product, portions of the metallic mercury will be carried throughout the remaining portions of the process wherein the organic phase is treated, often times resulting in contamination of other catalysts used and the like. It has also been found that the seals, joints, and the like, utilized in standard commercial operations are not satisfactory for handling the metallic mercury in the organic stream. Thus over a period of years the metallic mercury contained in the organic stream will leak out of the organic stream through the joints and seals and will contaminate the entire area of the process unit. This mercury not only presents a health problem but also represents a substantial financial loss. In certain instances where the waste effluent from the chemical process is disposed of, as for example, by dumping in streams and rivers, the presence of minute quantities of metallic mercury therein will, over a period of years, amount to a substantial amount. Obviously, such a situation is undesirable and should not be permitted to exist. Thus, it is highly advantageous that separation, from the organic stream of any metallic mercury present as a result of a chemical reaction, be substantially complete. Inasmuch as it is now possible to effect separation of the waste sulfuric acid from the metallic compound utilized as the catalyst for the chemical reaction, it is desirable as a pre-treatment to the former, to separate with the waste sulfuric acid all of the metallic mercury present in the system. In the instant invention, the separation is effected in a continuous manner. Because the continuous process is in its nature considerably more sensitive to operating conditions than batch processes, it is necessary that there be a stringent control of the process variables.

By the process of the present invention, a highly successful separation in a continuous manner of the organic phase from the acid phase is possible.

It is accordingly an object of our invention to remove in a continuous manner from the organic phase of a chemical reaction all of the entrained metallic mercury contained therein. It is a further object of the present invention to provide an efficient, continuous and flexible process for separating from a system containing a mixture of organic liquid, entrained metallic mercury and sulfuric acid, the sulfuric acid containing the metallic mercury in one phase and the organic liquid in a second phase. It is still a further object of our invention to separate waste sulfuric acid containing dispersed metallic mercury, which has been utilized as a catalyst in the diarylalkane synthesis reaction, from the organic phase of the reaction mixture. These and other objects of our invention will be discussed more fully hereinbelow.

The yield in the production of unsymmetrical diarylalkanes by the reaction of acetylene with a mono- or dialkyl substituted benzene has advanced so that it may be considered commercially feasible. In this reaction sulfuric acid containing mercuric sulfate dispersed therein is largely employed as the catalyst. The diarylalkanes produced are an important intermediate in the production of mono- and di-alkyl substituted styrene compounds. Procedures well known in the art are employed to crack thermally said diarylalkanes for the production of the styrene compounds. The styrene compounds ultimately produced find employment in the production of cast and molded plastic articles, binders, surface coatings, and the like. The diarylalkane process of making substituted styrenes is attractive because the product forms a polymer having improved thermal stability over the polymer from commercially available monomers. The diarylalkanes contemplated by the present invention are those having at least two carbon atoms attached to the paraffin chain and having both aryl substituents attached to the same carbon atoms.

Examples of diarylalkanes are such compounds as the isomers or mixtures thereof of the 1,1-ditolylethanes, each of the 1,1-dixylylethanes, each of the 1,1-ditolylpropanes, each of the 2,2-ditolylpropanes, each of the 1,1-di-(monochlorophenyl)-ethanes, each of the 1,1-di-(dichlorophenyl)-ethanes, each of the 1,1-di-(dimethylamino phenyl)-ethanes, each of the 1,1-dinaphthylethanes, each of the 1,1-dixenylethanes, and the like, and their nuclear-substituted halogen, amino, and other derivatives. These substances containing tolyl, xylyl, xenyl, monochlorophenyl, and dichlorophenyl groups may be attached to the carbon atom of the paraffin chain at the ortho, meta or para positions and when two of these groups are present, they may be attached in the same or different positions. These compounds may be prepared by the reaction of acetylene, or a substituted acetylene, and a mono- or di-alkyl substituted benzene in the presence of a suitable catalyst.

In the production of the 1,1-diarylethanes, for example, acetylene, is reacted with a compound selected from the group consisting of mono- and di-alkyl substituted benzenes in the presence of a sulfuric acid-mercuric sulfate catalyst. Examples of mono- and di-alkyl substituted benzenes that may be employed in the preparation of 1,1-diarylethanes are such as toluene, o-, p-, and m-xylenes, ethylbenzene, and the like. Long-chain mono- and di-alkyl substituted benzenes may also be employed when available. As previously stated, the catalyst employed in this reaction is sulfuric acid containing finely-ground and dispersed mercuric sulfate. Sulfuric acid of concentrations of from about 85% to about 105% may be used. It is preferred, however, that sulfuric acid of from about 88% to about 98.5% strength be utilized in the reaction.

In the diarylalkane synthesis, streams of the mono- or di-alkyl substituted benzene, acetylene, and sulfuric acid containing mercuric sulfate are charged continuously and concurrently into a suitable reactor equipped with stirrer and heat exchange means. The reacting mixture is stirred continuously to emulsify the acid and the hydrocarbons and to prevent catalyst deposition in the reactor. The temperature employed during the reaction may vary from about $-20°$ C. to about 70° C. but preferably maintained within the range of from about 0° C. to about 45° C. The reaction mixture containing an organic phase, sulfuric acid and metallic mercury is then introduced continuously into a suitable vessel, which provides suitable retention times to effect separation of the various components present.

The organic phase obtained as a result of the above-described reaction comprises primarily 1,1-diarylethane, a portion of the original mono- or di-alkyl substituted benzene charged and certain tarry products. The acid phase of the mixture comprises primarily sulfuric acid, the sulfonic acid of the substituted benzene charged into the reaction, e.g., organic sulfonates, some tarry products, and water. As previously indicated, the 1,1-diarylethane formed during the reaction will depend upon the particular mono- or di-alkyl substituted benzene charged into the reactor. Thus, when toluene is employed, 1,1-ditolylethane is formed; when xylene is charged, 1,1-dixylylethane forms; etc.

In the prior art separation, decantation, and/or sedimentation of these mixtures, the suspended particles have been separated from a liquid by methods such as hydraulic classification, cyclones, or similar procedures, which generally depend on the force of gravity for their motive power. The separation effected by these methods has been considerable, but the mercury which is still dispersed in the acid, by its cumulative effect, has been a source of considerable difficulty. According to the present invention, separation of substantially all of the mercury and the sulfuric acid from a mixture of organic compounds is accomplished in a continuous manner and employing a minimum of equipment. By a separation of "substantially all" is meant a mercury content in the organic phase of less than 5 parts per million and an acid content of less than 0.1% $H_2SO_4$.

In addition to effecting substantially complete separation, an important consideration is that the amount of organic liquid and acid remaining in the apparatus in the process of being treated be held to a minimum, so that the hazards due to a large amount of flammable organic liquid and corrosive and toxic sulfuric acid be as small as possible. In addition, practical considerations dictate that as small a volume as possible of the liquids be accumulated. According to the present invention, optimum conditions and sufficient time for the very fine mercury particles to coalesce and grow large enough to drop out of the organic phase—countercurrent to the rising organic stream—and move into the descending waste acid stream is accomplished. The invention succeeds in satisfying at least three requirements which are essential in treating the mixtures:

(1) The mercury and acid in the exit organic phase is less than the stated values of 5 parts per million of mercury.

(2) The amount of organic and acid held up in the apparatus is kept at a minimum. The method is continuous and flexible, so as to adapt to mixtures varying in acid to organic ratio.

(3) Sufficient time and proper flow conditions are provided so that the small mercury particles will coalesce and so grow large enough to descend into the waste acid stream.

In order that those skilled in the art may more fully understand the inventive concept herein presented, the following examples are given by way of illustration and not limitation, unless otherwise noted in the appended claims. All parts are parts by weight.

*Example 1*

Into a suitable reaction vessel equipped with stirrer and cooling means are charged continuously and concurrently streams of toluene, acetylene, and 95.5% sulfuric acid containing mercuric sulfate in the relative ratio of about 100:14:5 parts, respectively. The mercuric sulfate dispersion is present in the sulfuric acid in catalytic amounts, i.e., from about 0.05% to 5% based on the weight of the acid. The mixture is reacted with vigorous stirring at a temperature maintained at from about 8° C. to 10° C. for a retention time in the reactor of about 45 minutes.

As previously stated, reaction temperatures may vary within fairly wide limits. Although in the above example, the reaction retention time for any given particle in the continuous process is given as 45 minutes, this period may be varied within limits of from about 30 minutes to about 2 hours.

The stream leaving the reactor and entering the decanting vessel does so at the same rate at which the composite stream (or streams) of toluene, acetylene, and acid enter the reaction vessel. The reaction mixture containing the organic phase, the acid phase, and the finely-dispersed metallic mercury are then separated according to the procedure hereinafter more fully disclosed in connection with the accompanying drawing.

The material entering the decanting vessel or the separator is a substantially homogeneous mixture of organic liquid, sulfuric acid, and mercury because of the agitation of the mixture in the reaction vessel. The mercury presents is in the form of finely-dispersed droplets of liquid mercury. It has been found that by employing conventional continuous procedures that all of the entrained mercury does not settle but rather, an undesirable quantity of the entrained mercury will be carried out with the organic effluent. In order to obtain a substantially complete separation of the organic phase from the acid phase and also to obtain a complete separation of the metallic mercury with the waste acid, the procedure of the instant invention providing optimum conditions and retention periods with a minimum of liquid accumulation is set forth. The invention will be further illustrated by the simplified flow plan of the accompanying drawing. The process will be described in connection with the continuous separation of the reaction mixture obtained in the synthesis of 1,1-ditolylethane in the presence of mercuric sulfate, as set forth in Example 1, but it will be understood that the procedure is applicable to the separation of other diarylalkane synthesis products, wherein sulfuric acid and compounds of mercury are utilized.

Referring to drawing, the reactor 1 may be of any type suitable for carrying out the desired organic reaction, i.e., the condensation of toluene charged at 2 and acetylene 3 in the presence of strong sulfuric acid having a mercury catalyst dispersed therein shown entering at 4.

After the reaction has taken place, the reaction product is fed through line 5 into the separatory apparatus. The separation is effected in an apparatus comprising a cylindrical decanting vessel 6 surmounting a conical bottom 8. The reaction product stream is fed into the decanting vessel 6 at approximately the interface, shown at 11, of the organic and acid phases. The organic phase, following separation, is withdrawn from the top of the cylindrical vessel at 7. The acid phase containing mercury is withdrawn through the line 9, and up and through the loop 10, thereby effectively effectively sealing the acid in the container and attendant piping. The loop 10, having a vent 14 at the top, is constructed so as to be pivotable, as shown at 12 and 13, so that the innerface 11 between the acid and the organic material may be raised and lowered by pivoting the loop 10, thereby varying the pressure from the head of the liquid in the loop and lending flexibility to the system. The acid phase is then treated in a suitable manner at 15 to strip the mercury therefrom as by steam stripping according to the technique disclosed in the afore-mentioned pending U.S. application Serial No. 413,593 now U.S. Patent 2,832,810. The mercury is discharged together with steam at 17. The acid is discharged through the line 16 and may be further treated. The mercury recovered at 17 may be converted into mercuric sulfate, mercuric acetate, mercuric oxide, or other catalytic compounds of mercury by any suitable procedure and returned to the reactor 1 in either admixture with sulfuric acid or by separate addition.

The structure of the separating vessel 6 need not necessarily be constructed to have a cylindrical shape nor a conical base as shown. It is preferred that it be so constructed, however, in order that the amount of acid held up be at a minimum while maintaining the head at a maximum value. The vessel may have any shape: square, rectangular, spherical, or conical. The cylindrical shape is preferred because it keeps the accumulation of organic material at a minimum while keeping the velocity of upward flow of the organic material as low as possible. In addition, it is the simplest shape to fabricate.

It is also possible to have the vessel horizontal or inclined. Here the same principle will apply but the horizontal distance of travel of the organic liquid must be greater than the vertical travel in the case of the vertical decanter. This is true because the mercury droplets will have a horizontal component of velocity in addition to the gravity component. As in the case of the vertical decanter, the proper dimensions for optimum results are ascertained upon the volumetric rate of material to be processed, ratio of organic phase to acid phase, and amount and condition of mercury to be removed.

The reaction mixture is introduced into the separator at a point near the middle of the overall height of the liquid column in the decanting or separating vessel. Introduction of the mixture at a point approximately at the interface of the organic and acid liquid phases is critical in order to derive maximum advantage of separating conditions. The separation is carried out continuously, and it is critical in order to effect good separation that proper retention time be afforded. A minimal retention period is necessary so that the dispersion of mercury may coalesce to at least the extent that the mercury particles will be sufficiently large to prevent their being carried off by the upward flow of the organic phase, and will settle into and be drawn out by the lower sulfuric acid stream. According to the invention, it is necessary for a reaction mixture containing about 85% organic liquid to about 15% sulfuric acid and having a liquid-mercury content of about 1200 parts per million that the organic phase retention time be a minimum of about 0.5 hour while that of the acid be a minimum of about 2.5 hours. The separation is carried out at a constant temperature, which is preferably room temperature, in order to avoid convection currents in the mixture. Agitation should be avoided and agitation caused by the introduction of the mixture into the vessel should be minimized. The separation is carried out at atmospheric pressure. However, it can also be carried out at superatmospheric pressures and at subatmospheric pressures. As the reaction mixture enters the separator, as for example, the mixture obtained in Example 1, the 1,1-ditolylethane and toluene together separate in the organic layer. The sulfuric acid, organic sulfonates and water separate as the acid layer. The settling rate of the metallic mercury depends upon a number of factors, such as the force of gravity, the diameter of the mercury spheres, the density of the mercury spheres, the density of the fluid through which the spheres must pass, the viscosity of the fluid, the velocity of the organic layer flowing upward in the separator, and the like. The larger mercury particles settle with the acid layer at a comparatively rapid rate. The finer mercury particles which appear at the outset to remain suspended in the organic phase settle at a slower rate. It is to permit removal of these finer particles that a minimum retention time is necessary. In order to avoid removing any of the metallic mercury from the top of the separator, it is necessary that the liquid components of the mixture be maintained in the separator for at least 30 minutes to allow complete settling of the mercury. The U-shaped exit means attached to the bottom of the separator is also critical in obtaining full benefit of the invention, for it permits retention of the different phases in the separator for different periods possible, i.e., lends practical flexibility to the system. For example, by increasing the height of the U-shaped exit means, the interface between the organic layer and the acid layer can be adjusted, thereby adjusting the relative retention times of these streams. This interface is about at, and preferably just above, the inlet means of the mixture. As a result of the control of the position of the interface in the separator, the optimum retention times for the liquid components of the mixture are realized. It is necessary that the upward velocity of the organic layer in the separator be such that its upward flow does not present a drag or friction against the dispersed metallic mercury sufficient to carry the mercury out of the top of the separator with the organic material.

As will be apparent from the foregoing discussion, several factors must be critically controlled in order to obtain a substantially complete separation of the organic layer from the acid layer with the metallic mercury present in the reaction mixture. The relative cross-sectional area of the separator will affect the settling or clarification capacity thereof. It will be obvious that for a given volumetric rate of flow, the larger the cross-section, the lower the velocity of the upward moving organic layer. The volume of the separator must also be considered in determining the optimum size for the separator. For example, it is necessary that the height of the separator be such as to allow enough time to elapse during the passage of the organic layer to enable the mercury particles to coalesce and grow to a size large enough to settle out. By judiciously determining the retention time of the two liquid components of the mixture as herein set forth, it is possible to obtain a complete separation of the organic phase from the acid phase with the metallic mercury contained therein. As stated, the minimum holding time has been discovered to be at least 30 minutes. The final dimensions of the separator will depend upon the amount of material being treated and may easily be determined by those skilled in the art.

It will be apparent that various modifications are possible within the scope of the instant invention, and any enumeration of specific details is not intended to limit the invention, except as defined in the appended claims.

We claim:

1. A method of continuously separating the components of a liquid mixture containing liquid sulfuric acid, organic liquid and a dispersion of metallic mercury, obtained from the synthesis of unsymmetrical diarylalkanes which comprises charging said mixture into a separating vessel having a suitable height and cross-sectional area at a rate such that the organic liquid layer has a minimum holding time of 30 minutes, wherein said mixture separates into two layers and at a point in said vessel approximately at the interface of said layers, withdrawing the supernatant organic liquid stream from the top of said vessel and withdrawing the lower heavier liquid acid layer containing liquid mercury from the bottom through an inverted U-stream in order to effect control of the level of said interface.

2. A method of continuously separating the components of a liquid mixture containing as the synthesis reaction products of a 1,1-diarylethane, liquid sulfuric acid, an organic liquid and a dispersion of metallic mercury, which comprises charging said mixture into a separating vessel having a suitable height and cross-sectional area, at a rate such that the organic liquid layer has a minimum holding time of 30 minutes, wherein said mixture separates into two layers, and at a point in said vessel approximately at the interface of said layers, withdrawing the supernatant organic liquid stream from the top of said vessel and withdrawing the lower heavier liquid acid layer containing liquid mercury from the bottom through an inverted U-stream in order to effect control of the level of said interface.

3. A method of continuously separating the components of a liquid mixture containing as the synthesis reaction products of a 1,1-ditolylethane, liquid sulfuric acid, an organic liquid and a dispersion of metallic mercury, which comprises charging said mixture into a separating vessel having a suitable height and cross-sectional area, at a rate such that the organic liquid layer has a minimum holding time of 30 minutes, wherein said mixture separates into two layers, and at a point in said vessel approximately at the interface of said layers, withdrawing the supernatant organic liquid stream from the top of said vessel and withdrawing the lower heavier liquid acid layer containing liquid mercury from the bottom through an inverted U-stream in order to effect control of the level of said interface.

4. A method of continuously separating the components of a liquid mixture containing as the synthesis reaction products of a 1,1-dixylylethane, liquid sulfuric acid, an organic liquid and a dispersion of metallic mercury, which comprises charging said mixture into a separating vessel having a suitable height and cross-sectional area, at a rate such that the organic liquid layer has a minimum holding time of 30 minutes, wherein said mixture separates into two layers, and at a point in said vessel approximately at the interface of said layers, withdrawing the supernatant organic liquid stream from the top of said vessel and withdrawing the lower heavier liquid acid layer containing liquid mercury from the bottom through an inverted U-stream in order to effect control of the level of said interface.

References Cited in the file of this patent

UNITED STATES PATENTS

| | | |
|---|---|---|
| 1,147,881 | Morris | July 27, 1915 |
| 2,181,684 | Walker | Nov. 28, 1939 |
| 2,181,685 | Walker | Nov. 28, 1939 |
| 2,601,903 | Erwin | July 1, 1952 |
| 2,656,925 | Johnson | Oct. 27, 1953 |
| 2,728,457 | Clarke | Dec. 27, 1955 |